(12) United States Patent
Zivkovic et al.

(10) Patent No.: US 8,650,082 B2
(45) Date of Patent: Feb. 11, 2014

(54) SYSTEM AND METHOD FOR PROVIDING A USER TERMINAL WITH SUPPLEMENTAL INFORMATION TO A SEARCH RESULT

(75) Inventors: Aleksandar Zivkovic, North York (CA); Marvin Igelman, Thornhill (CA)

(73) Assignee: View2gether Inc., Culver City, CA (US)

( * ) Notice: Subject to any disclaimer, the term of this patent is extended or adjusted under 35 U.S.C. 154(b) by 401 days.

(21) Appl. No.: 12/912,019

(22) Filed: Oct. 26, 2010

(65) Prior Publication Data

US 2011/0119134 A1    May 19, 2011

Related U.S. Application Data

(60) Provisional application No. 61/255,046, filed on Oct. 26, 2009.

(51) Int. Cl.
*G06Q 30/00*      (2012.01)
(52) U.S. Cl.
USPC ..................................... 705/14.54; 705/14.39
(58) Field of Classification Search
USPC .......................................................... 705/14
See application file for complete search history.

(56) References Cited

U.S. PATENT DOCUMENTS

| 2006/0212352 A1 | 9/2006 | Avissar | 705/14 |
| 2008/0033818 A1* | 2/2008 | Avissar | 705/14 |
| 2010/0088149 A1* | 4/2010 | Sullivan et al. | 705/10 |

* cited by examiner

*Primary Examiner* — Nathan C Uber
(74) *Attorney, Agent, or Firm* — Sunstein Kann Murphy & Timbers LLP

(57) ABSTRACT

Illustrative embodiments of the present invention are directed to a method, a system, and a computer readable medium encoded with instructions for providing a user terminal with supplemental information to a search result. Illustrative embodiments of the present invention include receiving a search request from the user terminal. Once the search request is received, a set of search results is communicated to the user terminal. The set of search results includes search results that include information associated with at least a first business and a second business. These businesses are then notified of the search request using an electronic notification. Illustrative embodiments of the present invention also include receiving, from the first business, supplemental information associated with the first business that is responsive to the notification. The supplemental information is then communicated to the user terminal and at least the second business.

20 Claims, 21 Drawing Sheets

SYSTEM AND METHOD FOR PROVIDING A USER TERMINAL WITH SUPPLEMENTAL INFORMATION TO A SEARCH RESULT

PRIORITY

The present application claims the benefit of U.S. Application Ser. No. 61/255,046, filed Oct. 26, 2009, which application is incorporated herein, in its entirety, by reference.

TECHNICAL FIELD

The present invention relates to providing a user terminal with search results, and more particularly, providing a user terminal with search results related to businesses.

BACKGROUND

Prior art methods enable a user to query a search engine and to obtain a set of search results using his user terminal. For example, a user requests a search for restaurants and receives a set of search results containing a listing of restaurants. Certain prior art methods even tailor the set of search results according to the user's geographic location (e.g., a listing of restaurants in a particular area). Also, some prior art methods advise participating businesses that the user has made a query. Those participating businesses can then make contact with the user and provide him with an advertisement. Nonetheless, such prior art methods are not capable of conveniently providing the user terminal with supplemental information within a set of search results. Furthermore, the participating businesses are not made aware of each others advertisements and, accordingly, these prior art methods do not foster a competitive atmosphere among the participating businesses.

SUMMARY OF THE INVENTION

Illustrative embodiments of the present invention are directed to a method, a system, and a computer readable medium encoded with instructions for providing a user terminal with supplemental information to a search result. Illustrative embodiments of the present invention include receiving a search request from the user terminal. The search request includes a geographic location for the user terminal, a time associated with the search request, and a query (e.g., including a textual string of information). Once the search request is received, a set of search results is communicated to the user terminal. In some embodiments of the present invention, the set of search results is determined using the geographic location of the user terminal and the query. The set of search results includes search result that include information associated with at least a first business and a second business. In various embodiments, the information associated with the businesses includes information identifying the businesses. Once the search results are determined, the businesses within the search results are notified of the search request using an electronic notification. Illustrative embodiments of the present invention also include receiving, from the first business, supplemental information associated with the first business that is responsive to the notification. The supplemental information is then communicated to the user terminal and at least the second business.

Illustrative embodiments of the present invention are also directed to a method, a system, and a computer readable medium encoded with instructions for providing a user terminal with supplemental information to a search result, wherein the supplemental information is displayed within a set of search results. Such illustrative embodiments of the present invention include receiving a search request from the user terminal. Once the search request is received, a set of search results is communicated to the user terminal. The set of search results includes search result that include information associated with at least one business. Once the search results are determined, at least one business within the search results is notified of the search request using an electronic notification. Illustrative embodiments of the present invention also include receiving, from the at least one business, supplemental information associated with the business that is responsive to the notification. The supplemental information is then communicated to the user terminal and displayed within the set of search results.

Furthermore, in some embodiments of the present invention, the search request is communicated over the internet to a search engine. Once the search engine performs the search, the set of search results is received from the search engine and then at least one search result that is associated with the business is identified from the set of search results so that notification can be sent to that business.

In various embodiments of the present invention, the set of search results includes a plurality of search results that include information associated with a plurality of businesses. In some embodiments, the method further includes providing notification of the search request to the plurality of businesses and receiving, from at least one business of the plurality of businesses, supplemental information associated with the at least one business responsive to the notification. The supplemental information is then communicated to at least one other business of the plurality of businesses. In exemplary embodiments, the method further includes receiving, from at least one other business of the plurality of businesses, second supplemental information associated with the at least one other business and communicating the supplemental information to the user terminal and to the at least one business.

In illustrative embodiments of present invention, the supplemental information associated with the at least one business includes at least one of an offer for sale of services and an offer for sale of goods. In some embodiments, the notification provided to the at least one business includes the geographic location of the user terminal, the time associated with the search request, and the query.

In exemplary embodiments of the present invention, the supplemental information is displayed on the user terminal within the search result. In some embodiments, the user terminal is a mobile user terminal. In more specific exemplary embodiments, the user terminal is a smart phone that includes a GPS.

In various embodiments of the present invention, the method further includes receiving a message from the user terminal and communicating the message to the at least one business.

Furthermore, in some embodiments, after receiving the search request from the user terminal, the method generates a handle for the search request.

In more specific illustrative embodiments, the supplemental information is automatically communicated to the user terminal.

In another illustrative embodiment of the present invention, the method includes receiving a search request from the user terminal. The search request includes a geographic location for the user terminal, a time associated with the search request, and a query. A set of search results responsive to the search request is generated. The set of search results includes information associated with at least one service provider. In some embodiments, the information associated with the at least one service provider includes information identifying the service provider. Also, in some cases, the service providers are businesses that are potentially available to satisfy the query based on the location and time information in the search request.

The set of search results is then communicated to the user terminal. A notification of the search request is also provided to the at least one service provider. The method further includes receiving, from at least one service provider, supplemental information responsive to the notification and communicating the supplemental information to the user terminal.

In exemplary embodiments, the query also includes at least one of: (1) a query string entered by a user of the user terminal, (2) identification of a service selected from a menu of services (e.g., cab, food, movie, hair stylist, etc.), and (3) identification of a service associated with an application running on the user terminal (e.g., a cab applet, a food applet, etc.).

In various embodiments of the present invention, generating the set of search results includes at least one of: (1) generating the set of search results based on the information in the search request, (2) generating the set of search results based on search results obtained from a search engine, and (3) generating the set of search results based on a predetermined set of service providers.

In some embodiments, generating the set of search results based on search results obtained from a search engine further includes: (1) communicating a search query to the search engine over a communication network such as the Internet or other communication network, (2) receiving a set of search results from the search engine, and (3) generating the set of search results using the set of search results received from the search engine.

Furthermore, in some embodiments, the search query is a query from the search request and/or a search query formulated from the information in the search request. Also, in some cases, the set of search results includes information associated with a plurality of service providers and, optionally, the method includes communicating supplemental information received from one service provider to at least one other service provider.

In various embodiments, the method includes receiving, from at least one of said other service providers, second supplemental information responsive to the communicated supplemental information and communicating the second supplemental information to the user terminal and optionally to said one service provider and/or at least one other service provider.

In exemplary embodiments of the present invention, the supplemental information may include at least one of: (1) an offer from a service provider to provide goods or services, (2) a price associated with the offer to provide goods or services, (3) a discount (e.g., discount, coupon, rebate, etc.) associated with the offer to provide goods or services, (4) a time estimate associated with the offer to provide goods or services, and (5) a time limit for accepting the offer to provide goods or services.

In various embodiments of the invention, the notification to the at least one service provider includes the geographic location, the time associated with the search request, and the query. Furthermore, in some embodiments, the user terminal is a mobile user terminal such as a smart phone or personal digital assistant. Additionally, where the user terminal includes a GPS receiver, the geographic location may include one of: (1) location information obtained from the GPS receiver, and (2) location information entered by a user of the user terminal, e.g., to override the location information obtained from the GPS receiver.

In exemplary embodiments of the present invention, the method further includes receiving a message from the user terminal and communicating the message to the at least one business. Furthermore, in some cases the message includes at least one of: (1) acceptance of an offer from a service provider, (2) a counter-offer to one or more service providers, (3) a text message to one or more service providers, and (4) a voice message to a service provider. In additional embodiments, the method includes receiving a second message from a service provider and communicating the second message to the user terminal. In some cases, the second message includes at least one of: (1) a revised offer, e.g., including a revised price, discount, time estimate, time limit, etc., (2) a text message, (3) a voice message, and a video message, e.g., a picture of goods to be provided.

In exemplary embodiments of the invention, the method includes establishing direct communication between the user terminal and a service provider indicated by the user terminal.

In various embodiments of the invention, the method includes receiving unsolicited supplemental information from at least one service provider and communicating the unsolicited supplemental information to the user terminal.

In various embodiments, the method also includes establishing a communication connection with each of the service providers for sending the notification and receiving supplemental information. The method may also include communicating, to the user terminal, additional content (e.g., advertisements, links to related information, etc.) selected based on the query, location, time, search results received from a search engine, and/or supplemental information. Also, the method may further include displaying, on the user terminal, the set of search results, the supplemental information, and the additional content, wherein the supplemental information is displayed within the search results.

Illustrative embodiments of the present invention are directed to a server specially programmed to perform any of the processes described above.

Illustrative embodiments of the present invention are also directed to a user terminal specially programmed to send search requests, receive supplemental information and optionally additional content, send and receive messages, and display information, as described above.

Illustrative embodiments of the present invention are further directed an application specially programmed to run on a user terminal to send search requests, receive supplemental information (and optionally additional content), send and receive messages, and display information, as described above.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set of search results" includes one or more search results.

Figure 1A:
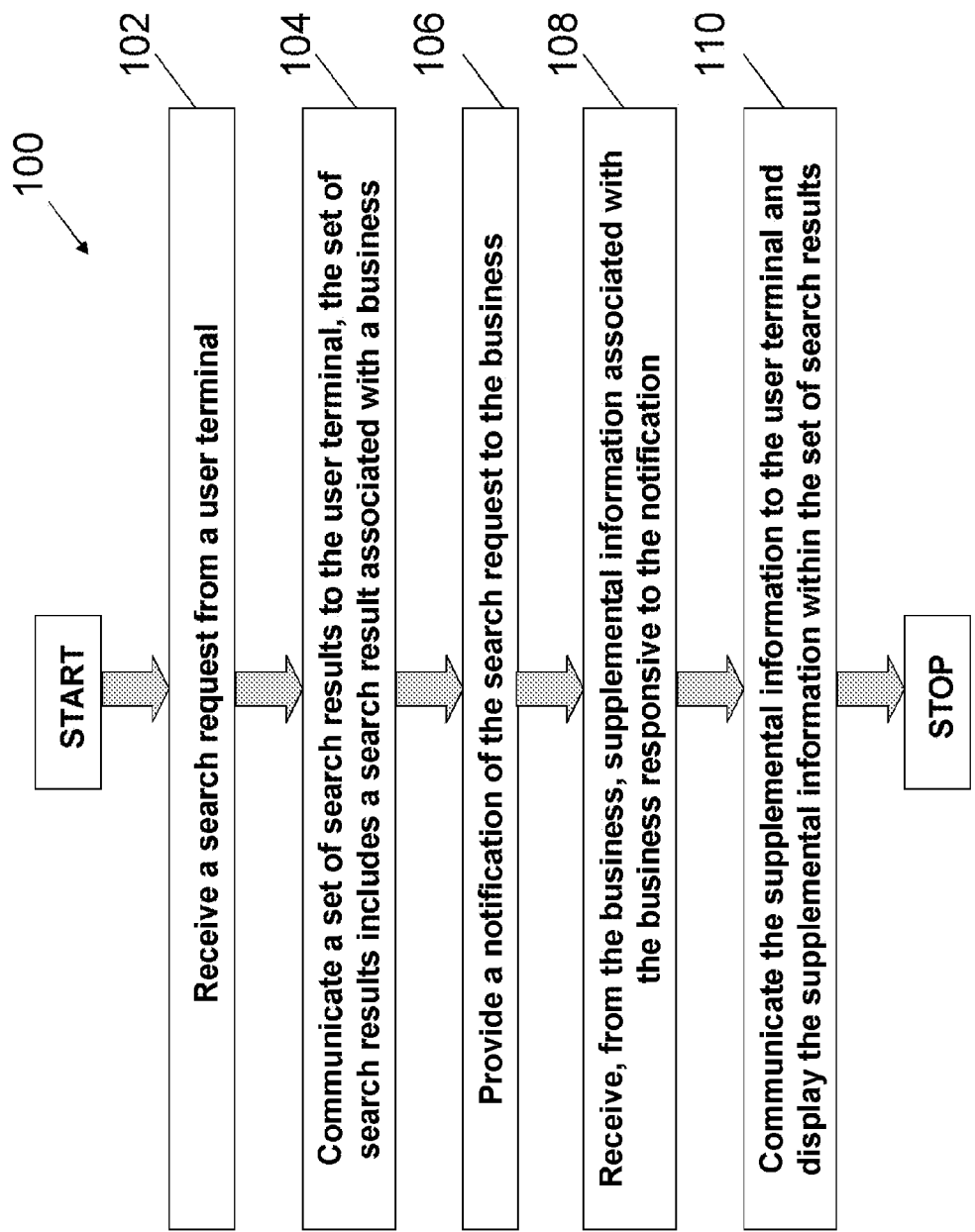
FIG. 1A shows a method for providing a user terminal with supplemental information to a search result, in accordance with one embodiment of the present invention.

Illustrative embodiments of the present invention are directed to a method, a system, and a non-transitory computer readable medium encoded with instructions for providing a user terminal with supplemental information to a search result. FIG. 1A shows a method 100 for providing a user terminal with supplemental information to a search result, in accordance with one embodiment of the present invention. The method 100 includes receiving a search request from the user terminal 102. The search request includes a geographic location for the user terminal, a time associated with the search request, and a query (e.g., including a textual string of information). Once the search request is received, a set of search results is communicated to the user terminal 104. In some embodiments of the present invention, the set of search results is determined using the geographic location of the user terminal and the query. The set of search results includes at least one search result that includes information associated with a business. In exemplary embodiments, the business may be a store, a retailer, a restaurant, a café, a dealership, a gas station, a service depot, and/or various other service providers. Once the search results are determined, at least one business within the search result is notified of the search request 106. Illustrative embodiments of the present invention also include receiving, from the business, supplemental information associated with the business that is responsive to the notification 108. The supplemental information is then communicated to the user terminal and displayed within the set of search results 110.

As explained above in the "Background" section, some prior art methods allow participating businesses to make contact with the user and provide him with advertisements. Nonetheless, such prior art methods are not capable of conveniently providing the user terminal with supplemental information within the set of search results. Furthermore, the participating businesses are not made aware of each others advertisements. Accordingly, these prior art methods do not foster a competitive atmosphere among the participating businesses. Illustrative embodiments of the present invention are capable of doing so. For example, illustrative embodiments of the present invention provide a user terminal with a listing of restaurants in a particular area and then supplement those listings with an offer on a three course meal from one of the restaurants. In further illustrative embodiments, other restaurants in the search results are notified of the first restaurant's offer. Then, the other restaurants also provide their own offers to the user terminal. Each of the restaurants is notified of the competing offers. Accordingly, a bidding war ensues. In this manner, illustrative embodiments of the present invention facilitate competition between the businesses. Also, in illustrative embodiments, the competing offers are conveniently provided to the user within the set of search results. In this manner, the user can easily view and compare the competing offers as they are updated in a real-time fashion within the set of search results.

Figure 1B:
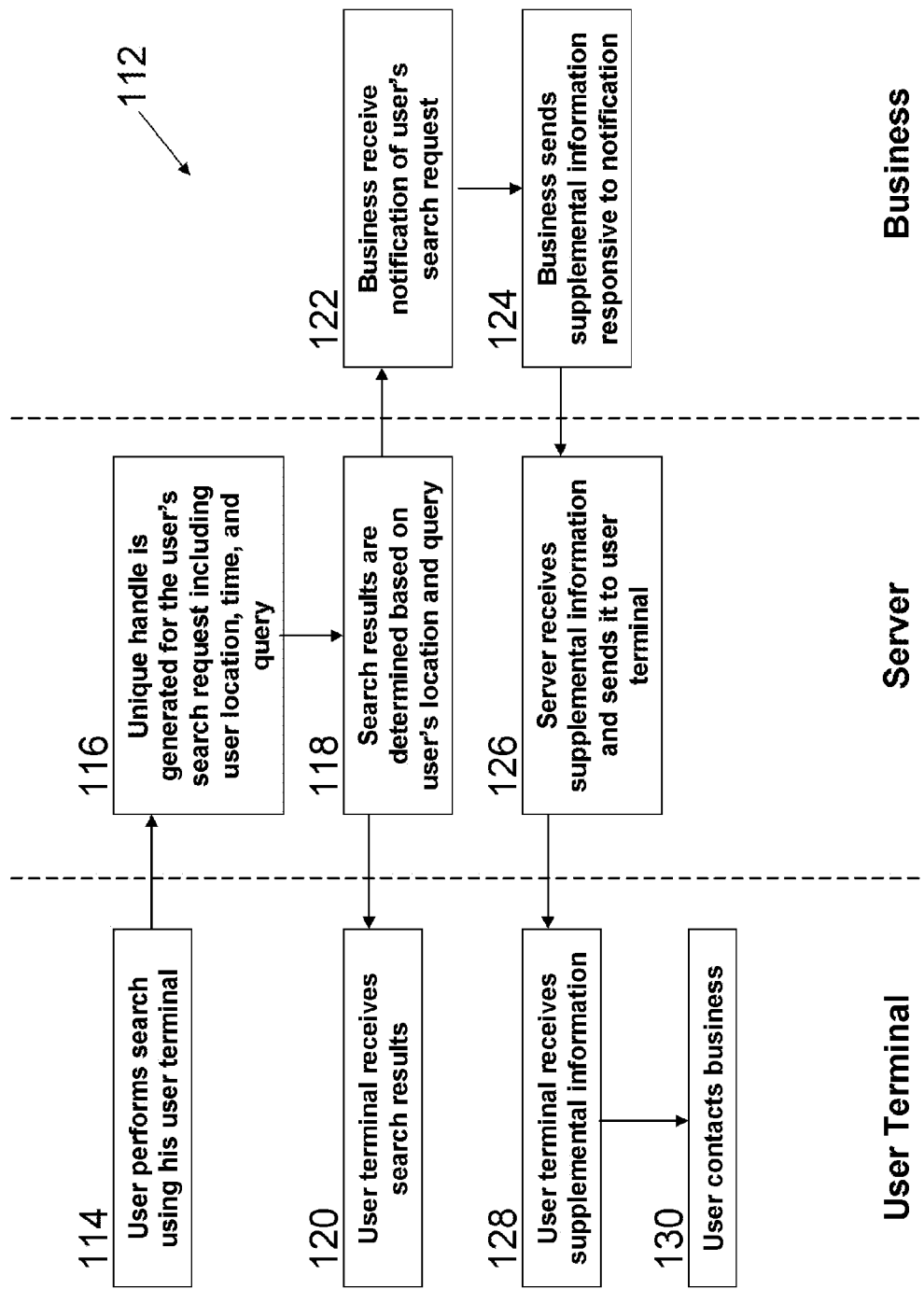
FIG. 1B shows a method for providing a user terminal with supplemental information to a search result, in accordance with a specific embodiment of the present invention.
Figure 2:
FIG. 2 shows a user terminal and with a user terminal application, in accordance with one embodiment of the present invention.

FIG. 1B shows a method 112 for providing a user terminal with supplemental information to a search result, in accordance with a specific illustrative embodiment of the present invention. The method starts when a user uses an application on a user terminal to search a topic (e.g., a taxi cap service, restaurant, florist, or supermarket) 114. FIG. 2 shows an example of a user terminal 200 with a user terminal application 202, in accordance with one embodiment of the present invention. In the embodiment shown, the user terminal 200 is a smart phone, however, other embodiments of the present invention may use other types of user terminals. In some embodiments, the user terminal 200 is a mobile terminal such as a cellular phone, smart phone, personal digital assistant, or a lap top computer. In other embodiments, the user terminal 200 is more stationary, such as a desk top computer.

In the present example, the user searches the textual query string "gas station." This query string, and other search parameters (e.g., the user terminal's location and the time associated with the search request) are sent over a communications network (e.g., the Internet) and received by a server. In some embodiments, the server creates a unique handle that identifies the user terminal 200, the search request, and includes the search parameters 116.

Figure 3:
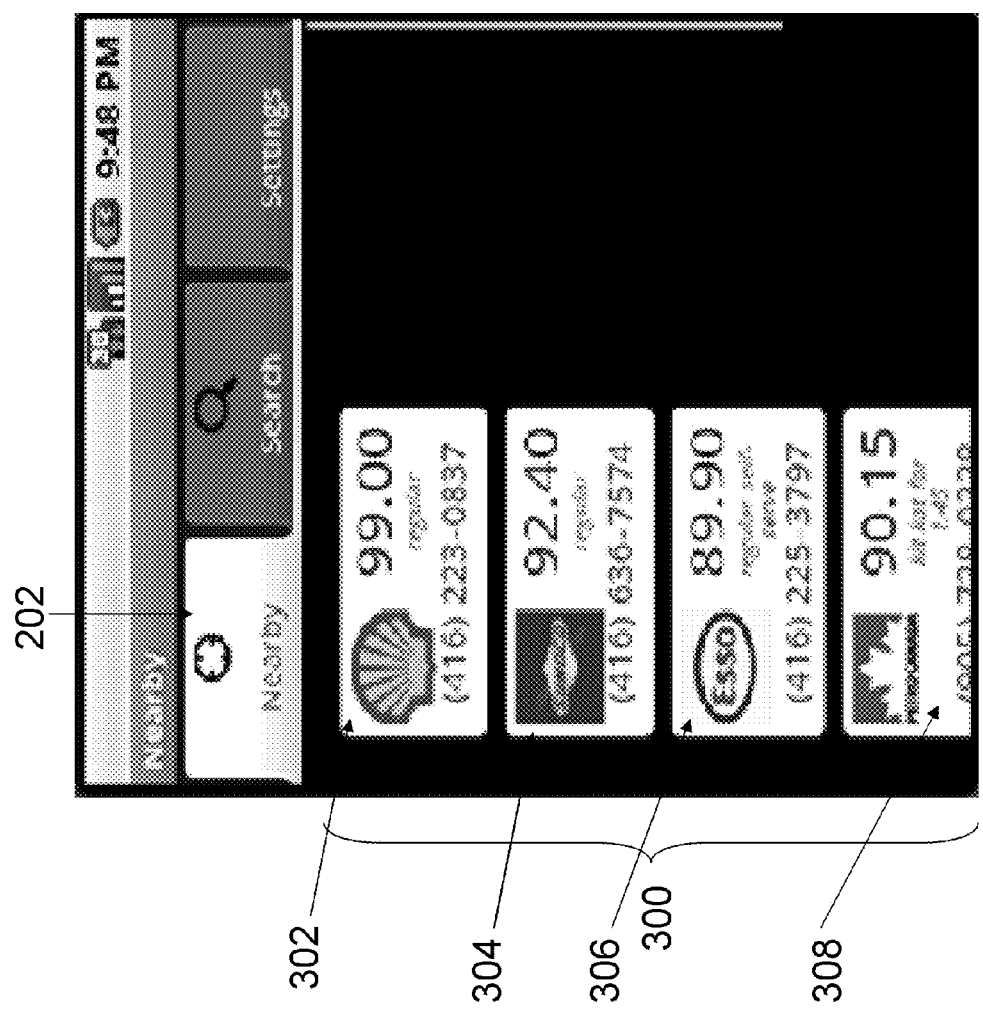
FIG. 3 shows an example of a set of search results, in accordance with one embodiment of the present invention.

In exemplary embodiments of the present invention, the server uses the search parameters (e.g., location, time, and query string) to determine appropriate search results 118. For example, in the present case, the server receives the query string "gas station" and the location provided by the GPS. The server then determines at least one participating business associated with the search parameters. A participating business is a business that is in communication with the server or otherwise has an established relationship with the server, whereas a non-participating business is one that is not in communication with the server and does not have an established relationship. In exemplary embodiments, a participating business has installed software that enables the business to send supplemental information to the server and receive notifications from the server. Based on the search parameters in the present example, the server determines four search results: "Shell™," "Sunoco™," "Esso™," and "Petro-Canada™." The set of search results are communicated over the communications network to the user terminal 200, 120. FIG. 3 shows how the set of search results 300 is displayed to the user on the user terminal 200, in an exemplary embodiment.

In other embodiments, the server does not determine appropriate search results 300. Instead, the server forwards the search parameters to a search engine such as Google™, Yahoo™, or Microsoft Bing™. Once the search engine determines the set of search results 300 based on the search parameters, the search results are sent back to the server. In some embodiments, the set of search results 300 is received in XML format. The server then determines which information in the search results 300 is associated with participating businesses. The server may find participating businesses in the set of search results (e.g., by searching for their respective phone numbers). In some embodiments, the phone number is also the unique identifier that the server uses for the business. However, in other embodiments, the server may user other identifiers, such as the business's name or address.

In exemplary embodiments, the search results (e.g., participating businesses and, optionally, the non-participating businesses) 300 are communicated to the user terminal 200 as shown in FIG. 3. The application 202 displays a badge for each business 302, 304, 306, and 308. In the present example, the badges 302, 304, 306, and 308 include a logo for the business, a price for gas, a phone number, and a window for inserting supplemental information.

Figure 4:
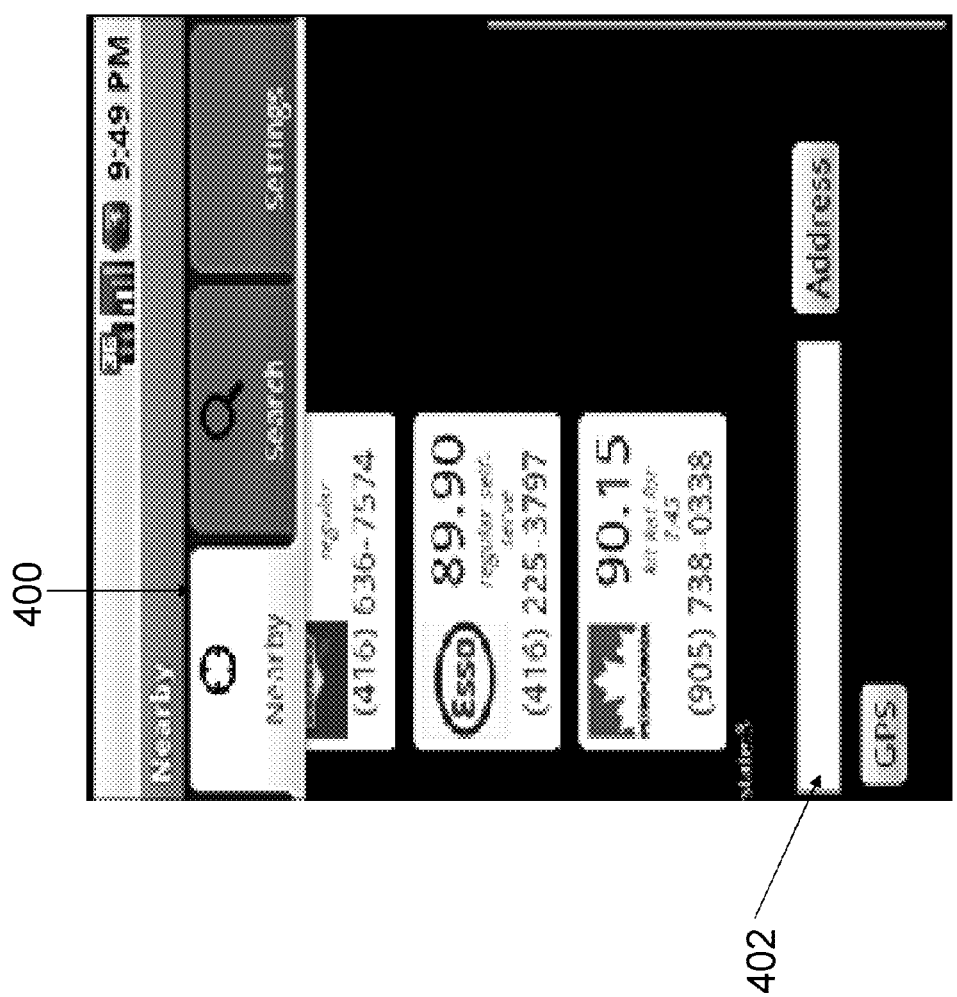
FIG. 4 shows an example of an address entry window, in accordance with one embodiment of the present invention.
Figure 5:
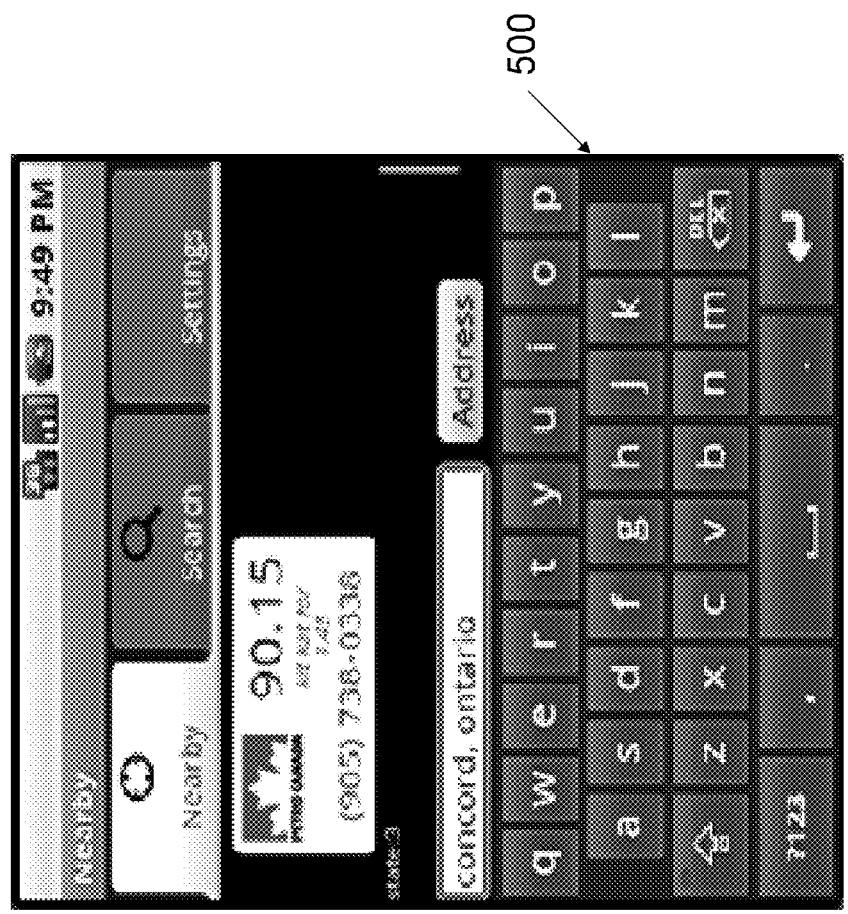
FIG. 5 shows a more detailed example of an address entry window, in accordance with one embodiment of the present invention.
Figure 6:
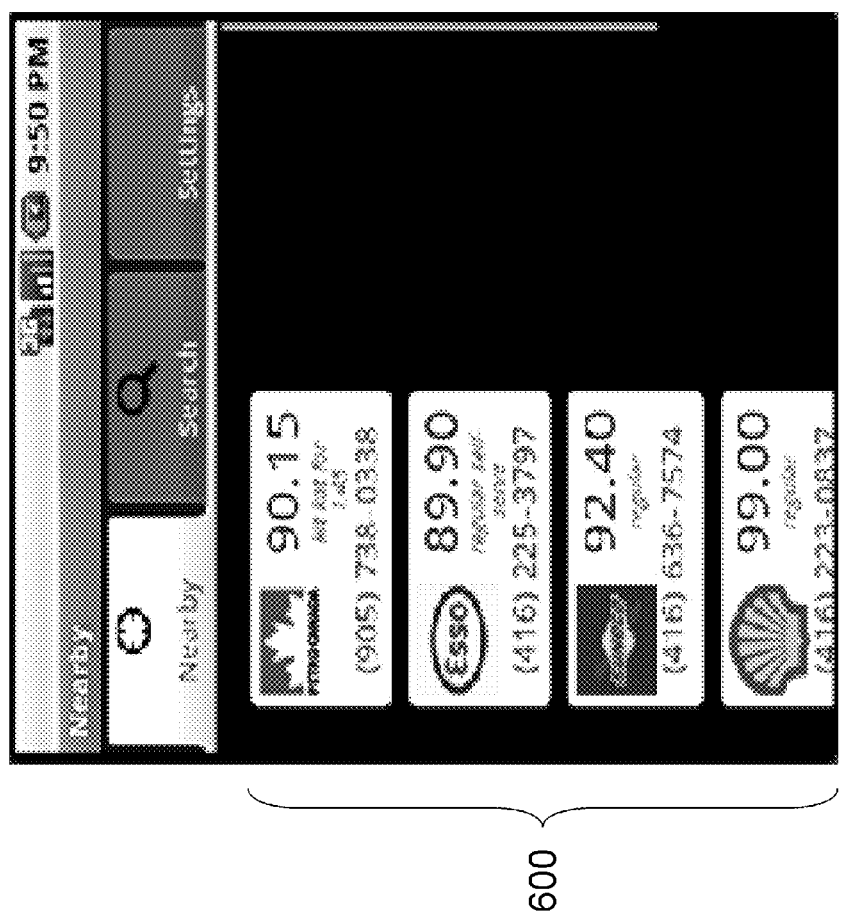
FIG. 6 shows an example of another set of search results, in accordance with one embodiment of the present invention.

In the embodiment shown, the location information was obtained from a GPS within the user terminal. However, in other embodiments, (e.g., where the user terminal does not have a GPS, the GPS is not accessible, or the user wants to use a different location), the location may be entered manually. FIG. 4 shows an example of an application 400 that includes an entry window 402 for an address. In FIG. 5, the user manually enters a "Concord, Ontario" address using the keyboard 500 of the user terminal 200. FIG. 6 shows search results 600 based on the new Concord, Ontario location. In yet another illustrative embodiment, the location of the user terminal 200 is obtained through cellular tower triangulation.

In illustrative embodiments of the present invention, the participating businesses are notified of the user search requests 122. In other words, if the participating business is within the set of search results 300 communicated to the user terminal 200, the participating business is made aware of the communication. In some embodiments, the notification includes the handle, the geographic location of the user terminal 200, the time associated with the search request, and/or the query (e.g., a textual string of information).

Figure 7:
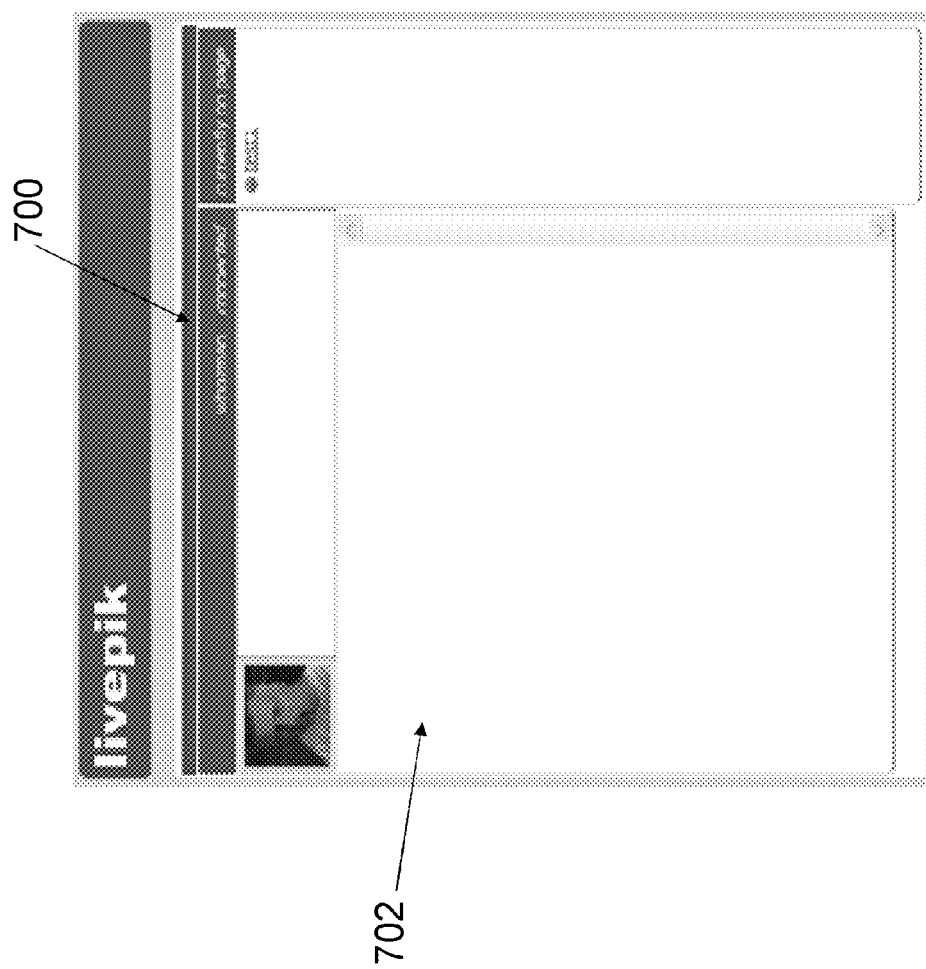
FIG. 7 shows an example of a dashboard application, in accordance with one embodiment of the present invention.
Figure 8:
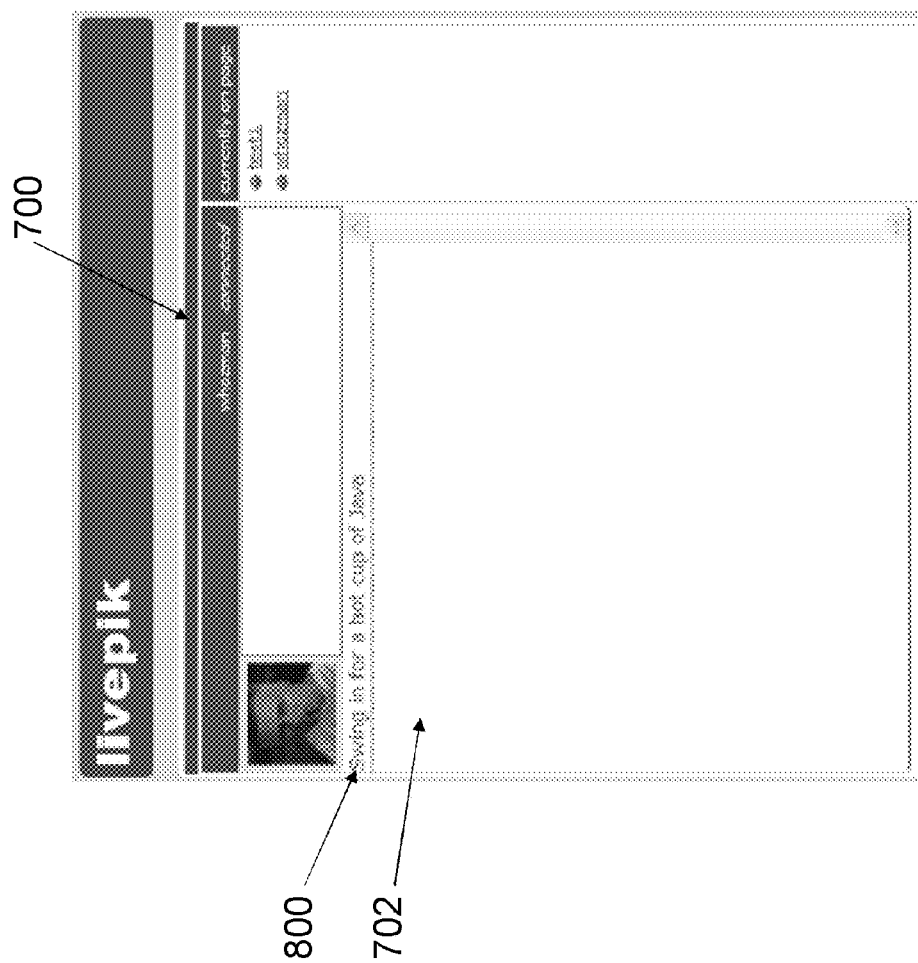
FIG. 8 shows an example of a business entering supplemental information into an entry window in the dashboard application, in accordance with one embodiment of the present invention.

Once the notification has been received, the business is able to respond by sending supplemental information back to the server 124. For example, if the search string is "gold bracelets," the business can send supplemental information related to gold bracelets. The business can communicate with the server using a "dashboard" application. FIG. 7 shows an example of a dashboard application 700, in accordance with one embodiment of the present invention. In exemplary embodiments, the dashboard application 700 includes an entry window 702 for communicating with user terminals and a listing of notifications sent to the business by the server. In response to the notification, the business may enter supplemental information into the entry window. In FIG. 8, the Sunoco gas station entered the following supplemental information: "Swing in for a hot cup of java" 800. This supplemental information 800 is sent to the server over a communications network, such as the Internet. In some embodiments, the supplemental information 800 includes a handle identifying the original search request and the unique identifier for the business (e.g., phone number).

Once the server receives the supplemental information, it communicates the information to the user terminal 200 using the particular handle for the search request 126, 128. Furthermore, in exemplary embodiments, in order to communicate the supplemental information 800 to the user terminal 200, the server maintains communication with the user terminal after responding to the search request by using, for example a TCP-IP protocol, Bayeux protocol, Long Poll protocol, or HTTP Streaming protocol. The server may use similar protocols for maintaining communication with the various participating businesses.

In illustrative embodiments, once the supplemental information 800 is received by the user terminal 200, the supplemental information is displayed within the set of search results. For example, in FIG. 9, the supplemental information is displayed within the badge associated with the business. More particularly, the supplemental information "Swing in for a hot cup of java" 800 is displayed within the Sunoco badge 900. Accordingly, such supplemental information 800 may persuade the user to visit Sunoco and purchase fuel or a "hot cup of java," or perhaps receive a free coffee as an incentive. In exemplary embodiments of the present invention, the supplemental information 800 is automatically communicated to the user terminal once it is received by the server. In other words, the supplemental information 800 is pushed to the user terminal without user intervention or action in real-time.

Figure 9:
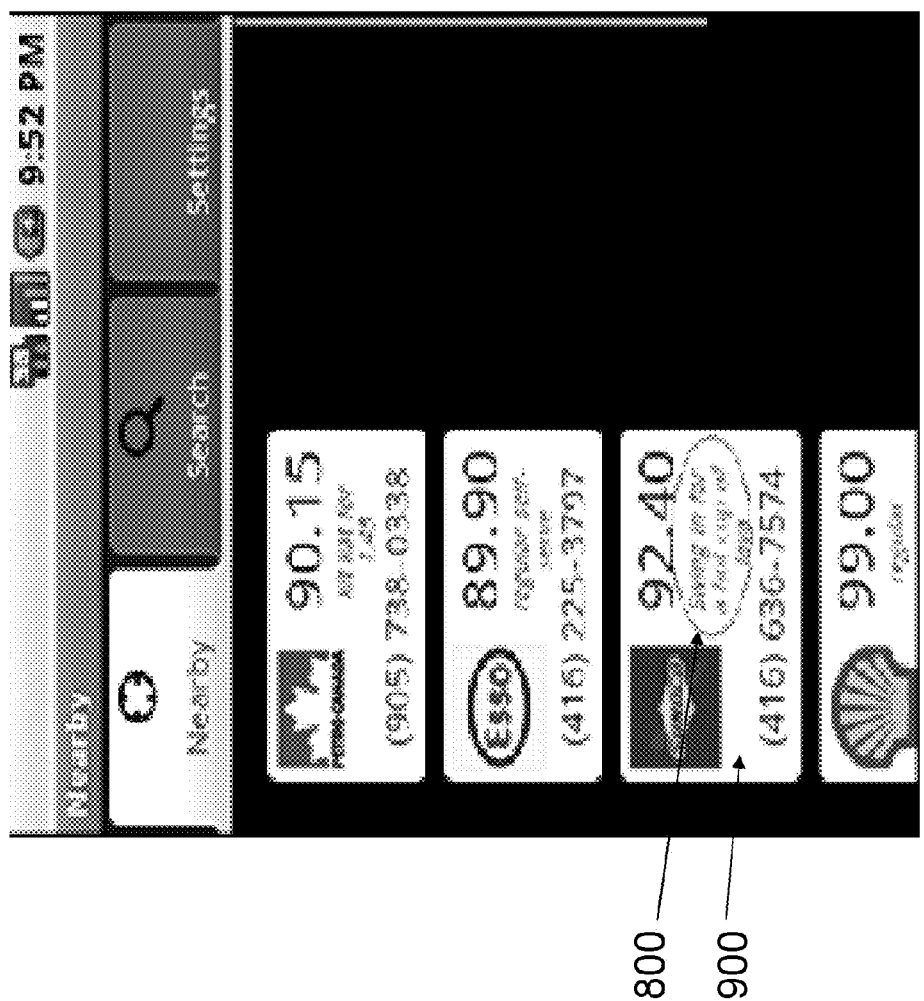
FIG. 9 shows an example of supplemental information being displayed on a user terminal, in accordance with one embodiment of the present invention.
Figure 10:
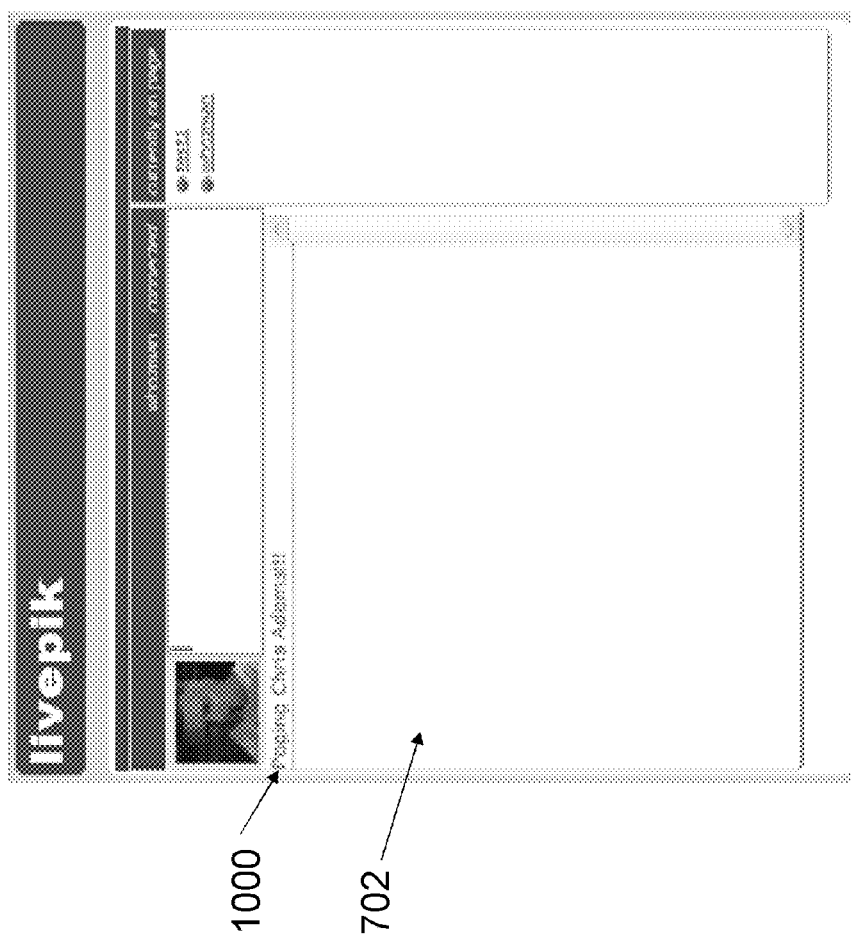
FIG. 10 shows an example of another business entering supplemental information into an entry window in a dashboard application, in accordance with one embodiment of the present invention.
Figure 11:
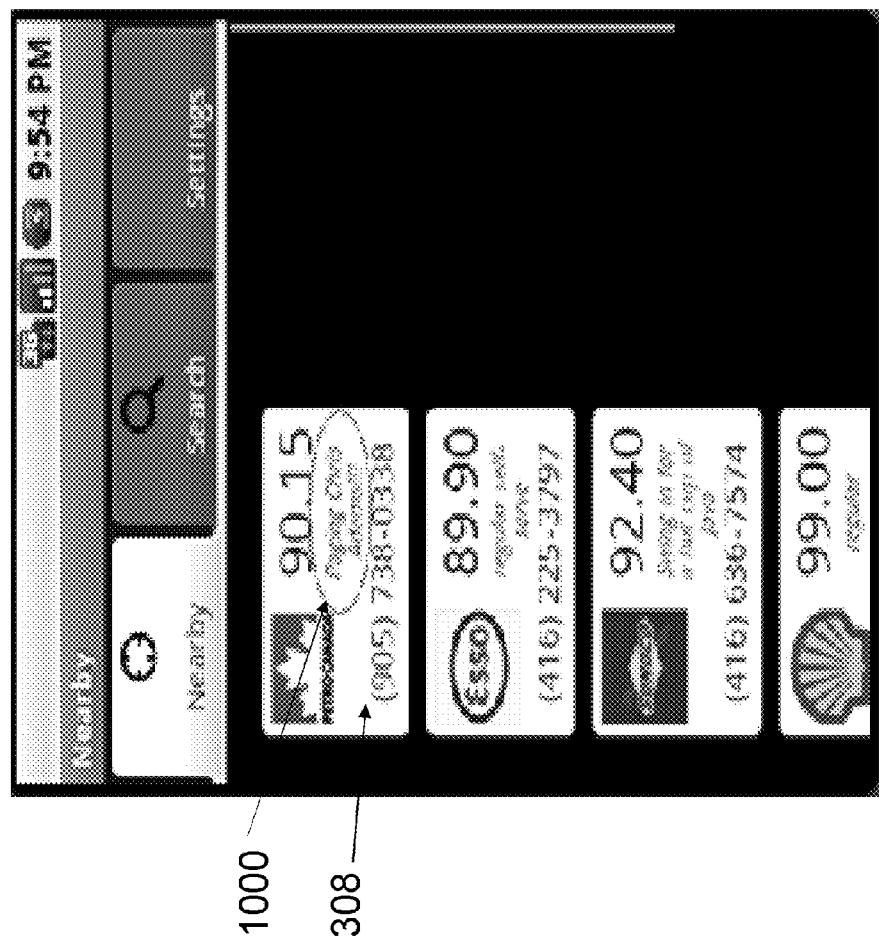
FIG. 11 shows another example of supplemental information being displayed on a user terminal, in accordance with one embodiment of the present invention.

In FIG. 9, the supplemental information 800 from Sunoco is an advertisement (e.g., an offer for sale of services and/or an offer for sale of goods), but in other embodiments, the supplemental information may be, among other things, breaking news, stock tickers, game scores, or weather updates. In some embodiments, the supplemental information 800 is textual, but in other embodiments, the supplemental information can also include links, images, videos, voice communication, push-to-talk communication (e.g., similar to CB Radio), or other media. In FIG. 10, for example, Petro-Canada enters the phrase "Paging Chris Adams!!!" 1000 into the entry window 702, which is entirely unrelated to advertising. This supplemental information 1000 is then sent to the user terminal and appears in the Petro-Canada badge 308 as shown in FIG. 11.

Figure 12:
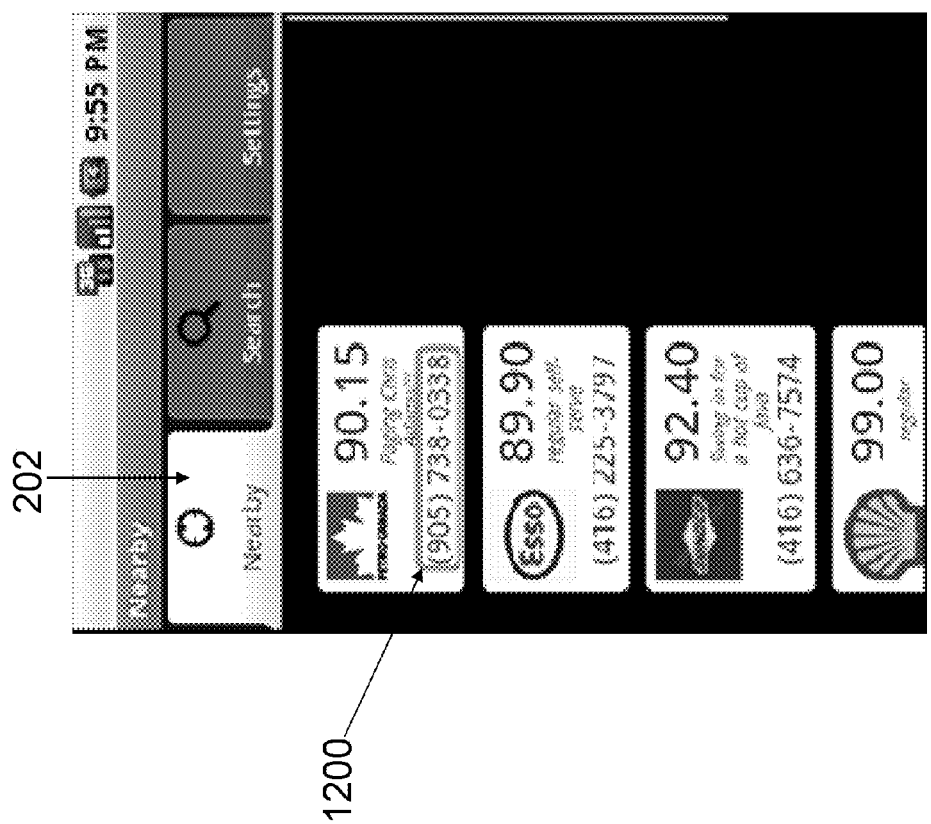
FIG. 12 shows an example of a user selecting a phone number of a business, in accordance with one embodiment of the present invention.

In illustrative embodiments, in order to respond to the supplemental information 1000, the user may contact the business 130. For example, in some embodiments, the user can manually dial the number associated with Petro-Canada or, as in the embodiment of FIG. 12, the user can simply select the number 1200 and the application 202 will connect the user to Petro-Canada. Additionally or alternatively, the server can support messaging between the user terminal 200 and the business (e.g., similar to instant messaging). In such an embodiment, the server receives messages from the user terminal 200 and communicates the messages to the business. Vice-versly, the server also receives messages from the business and communicates the messages to the user terminal 200. In yet another illustrative case, the user contacts the business by physically visiting the business.

Figure 1C:
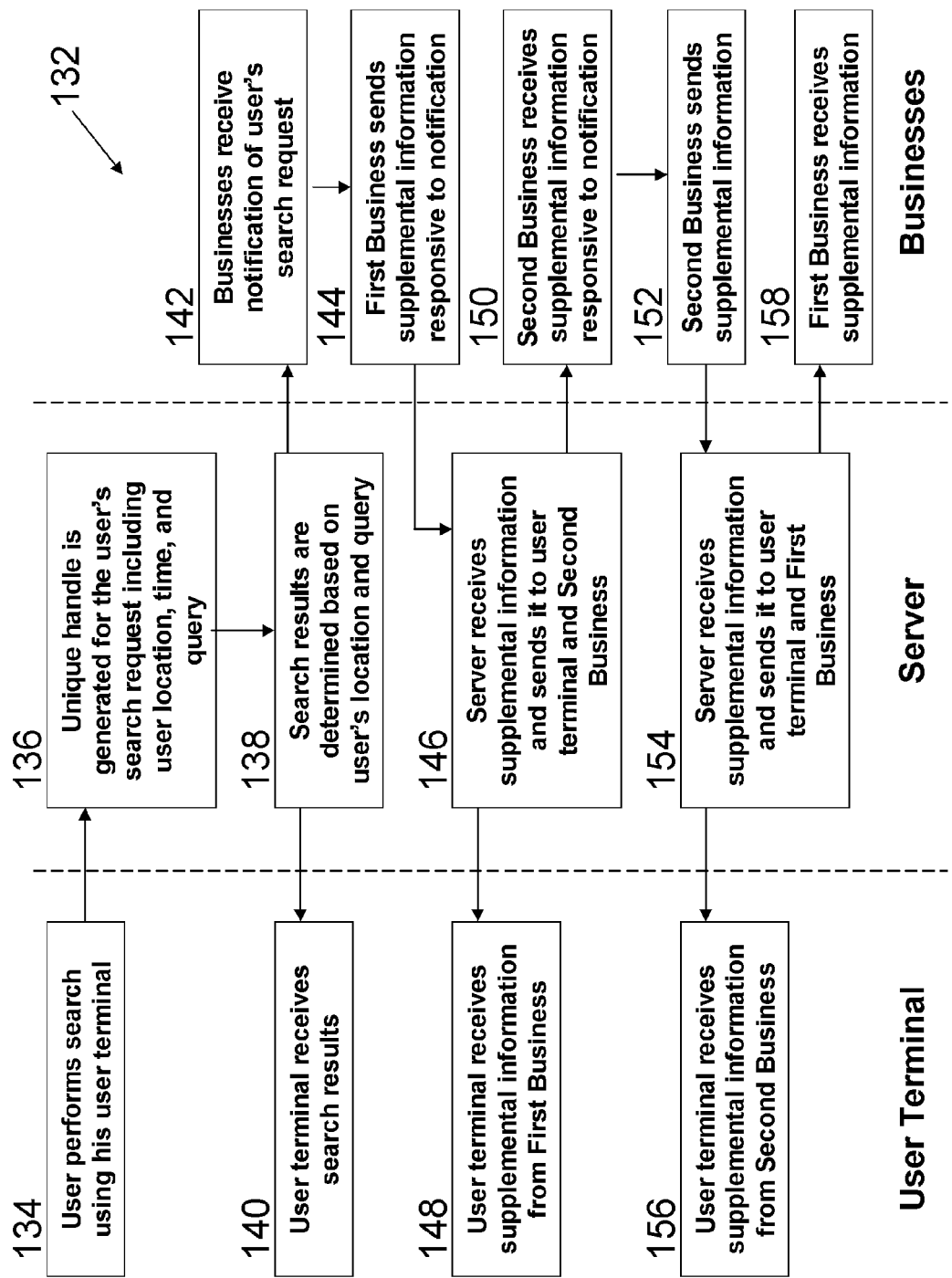
FIG. 1C shows a method for providing a user terminal with supplemental information to a search result, in accordance with another specific embodiment of the present invention.
Figure 13:
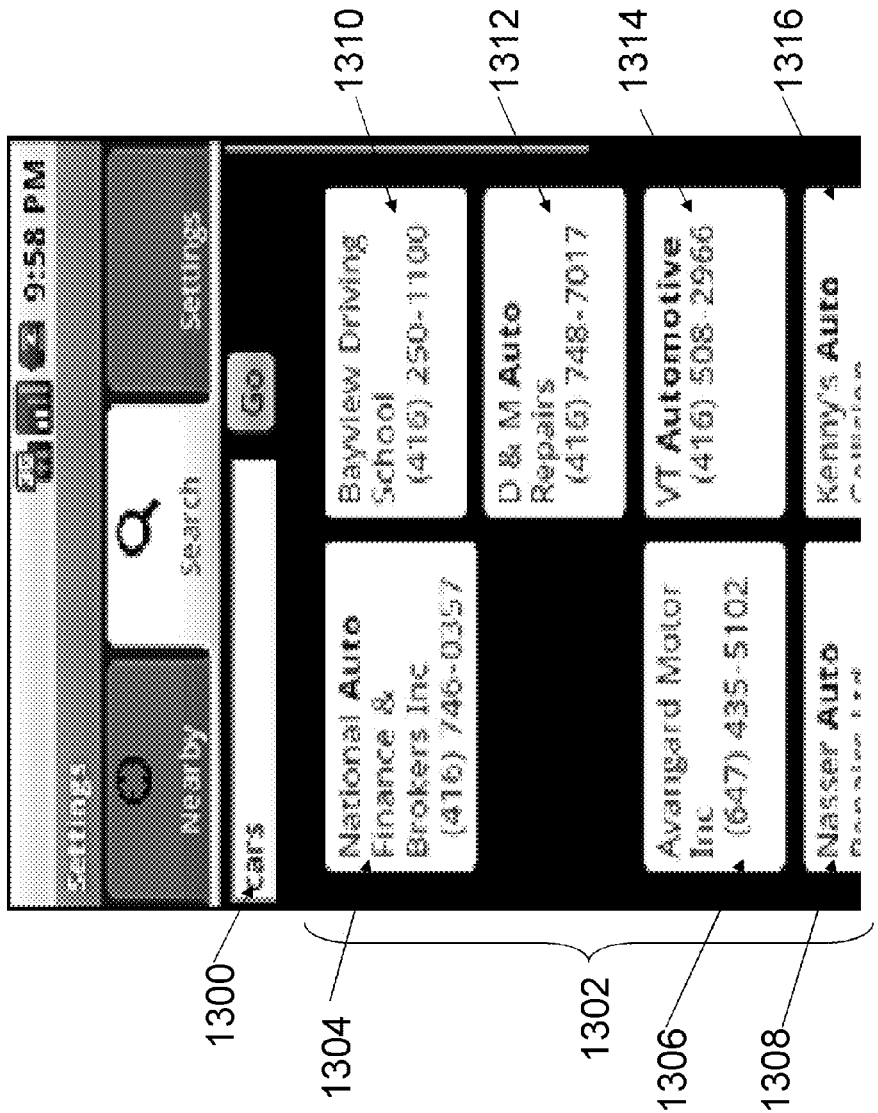
FIG. 13 shows an example of a set of search results based on a first query string, in accordance with one embodiment of the present invention.

FIG. 1C shows a method 132 for providing a user terminal with supplemental information to a search result, in accordance with another specific embodiment of the present invention. The method starts when the user performs a search using their user terminal 134. For example, in FIG. 13, the user enters the query string "cars" into the search entry window 1300. In response to this query string, the server creates a handle for the search 136 and communicates a set of search results 1302 to the user terminal 138. The search results 1302 are displayed as seven badges (e.g., "Bayview Driving School" and "National Auto Finance and Brokers Inc.") 1304, 1306, 1308, 1310, 1312, 1314, and 1316.

Figure 14:
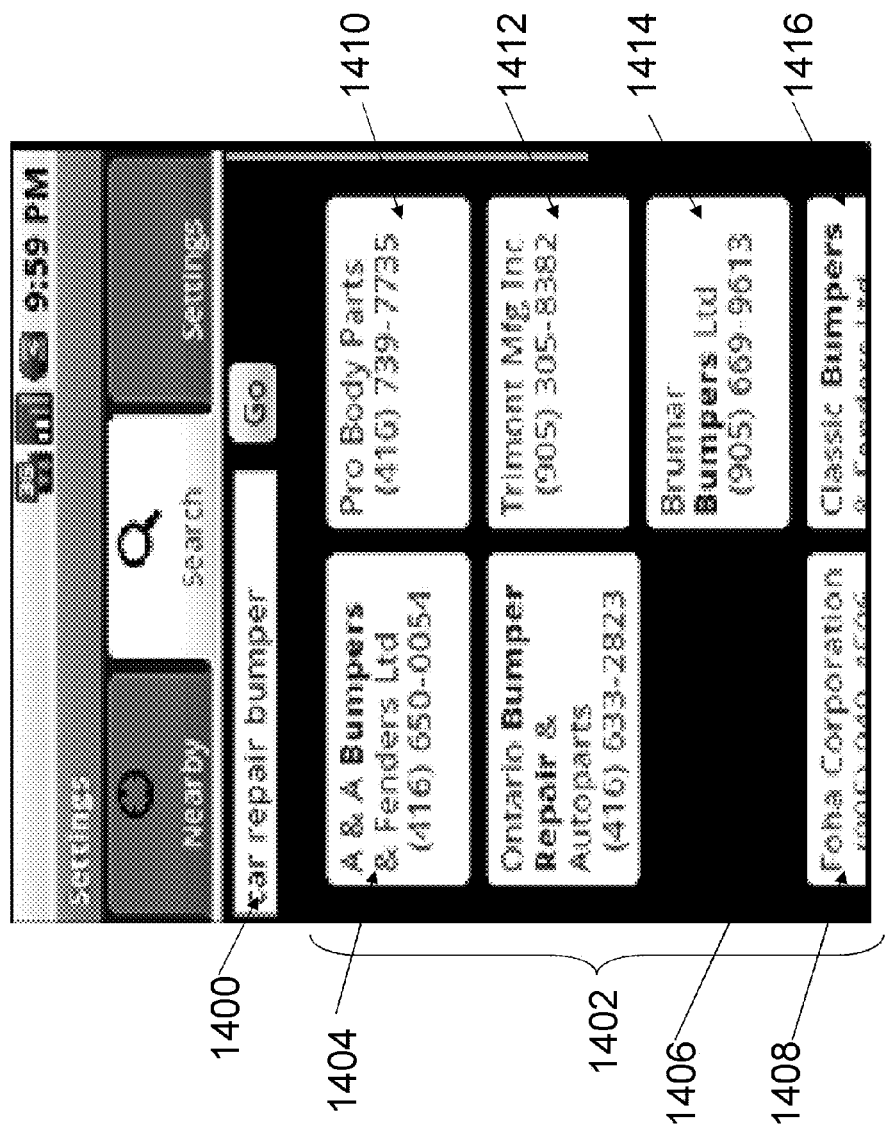
FIG. 14 shows an example of another set of search results based on a second query string, in accordance with one embodiment of the present invention.

In some cases, the user may decide that the set of search results is not relevant. In such a case, the user may enter a new query string 134. In FIG. 14, the user enters the query string "car repair bumper" 1400. The server receives the new query string 1400 and provides a new set of search results 1402 to the user terminal 138, 140. The search results 1402 appear as seven badges 1404, 1406, 1408, 1410, 1412, 1414, and 1416. The server also notifies the participating businesses of the search request 142. In some embodiments, the server also notifies the participating businesses from the first search request that their badges are no longer being displayed and, therefore, there is no need to send supplemental information.

Figure 15:
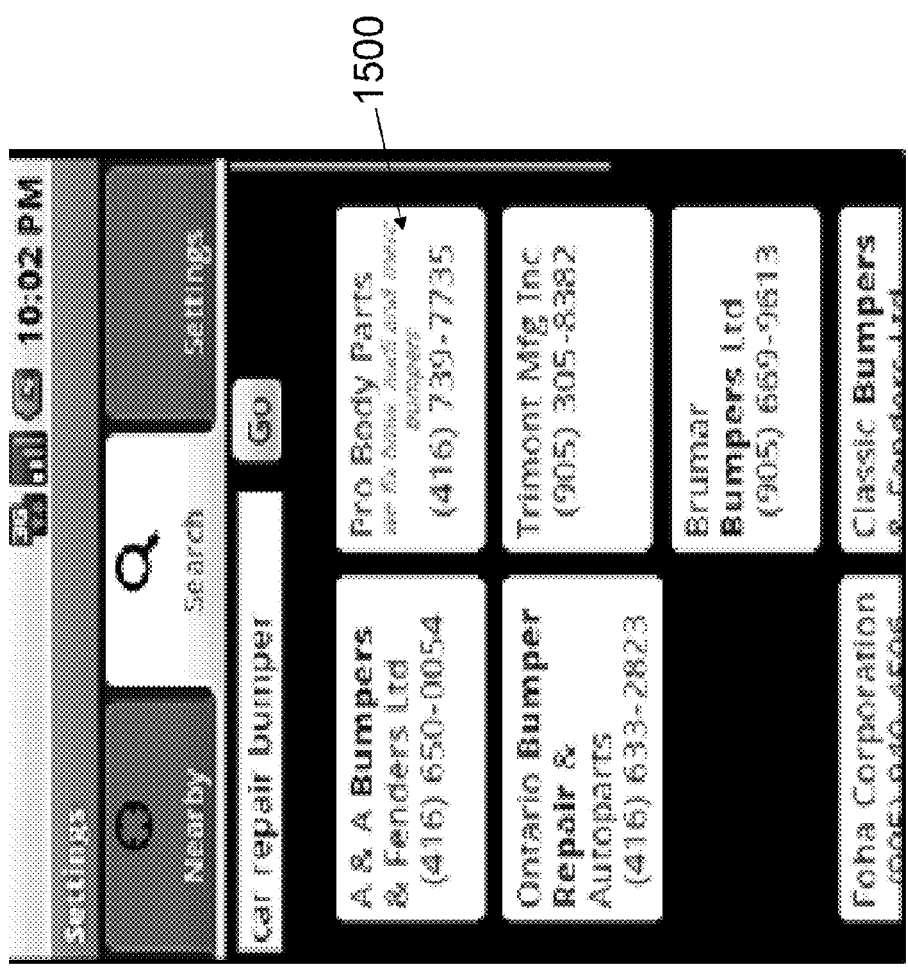
FIG. 15 shows an example of supplemental information being displayed on a user terminal for a first business, in accordance with one embodiment of the present invention.
Figure 16:
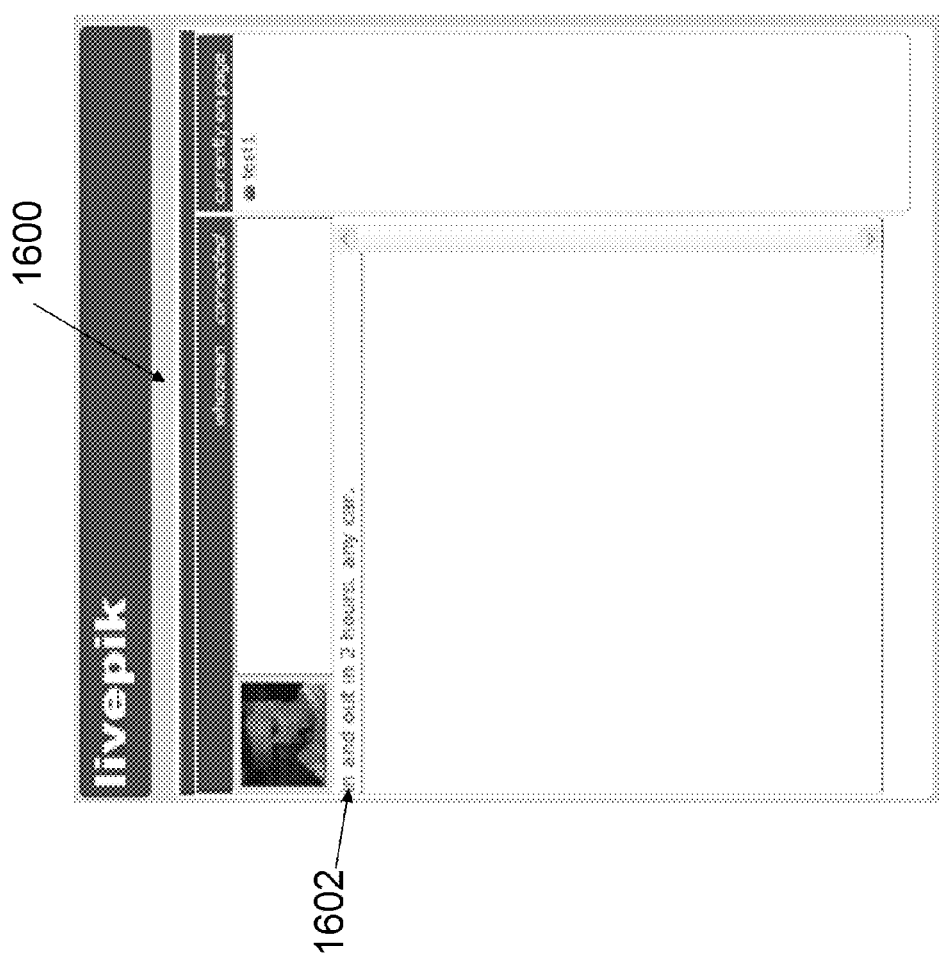
FIG. 16 shows a second business entering second supplemental information into an entry window in a dashboard application, in accordance with one embodiment of the present invention.
Figure 17:
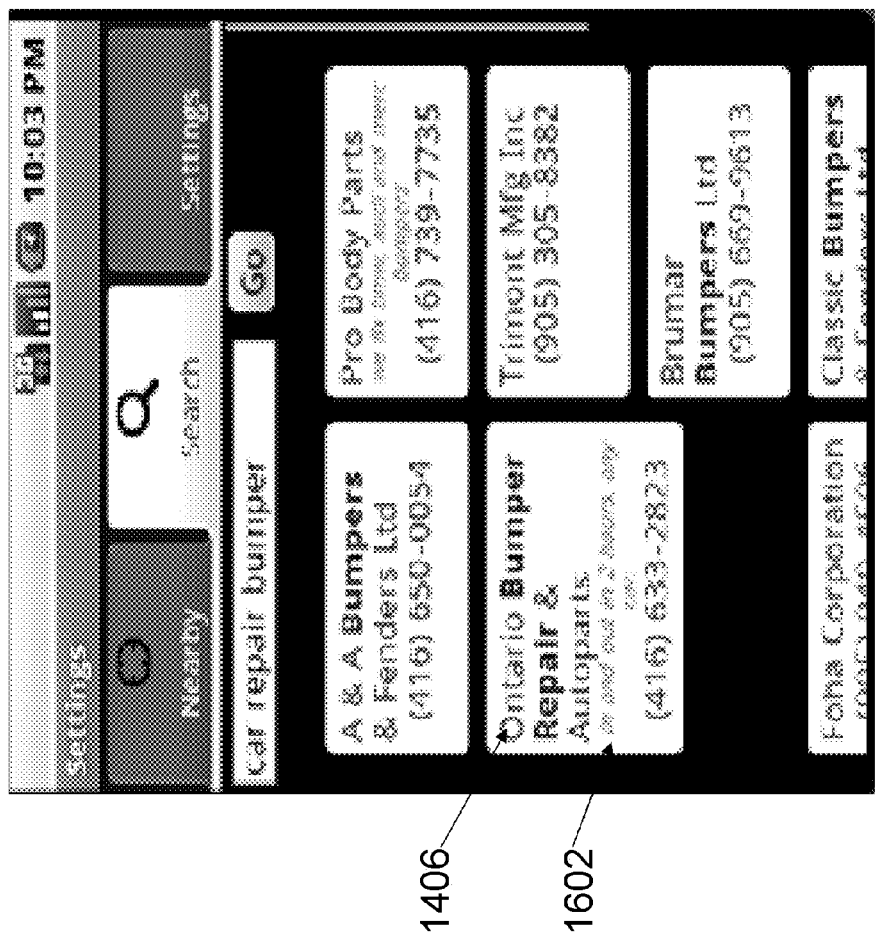
FIG. 17 shows an example of second supplemental information being displayed on a user terminal for a second business, in accordance with one embodiment of the present invention.
Figure 18:
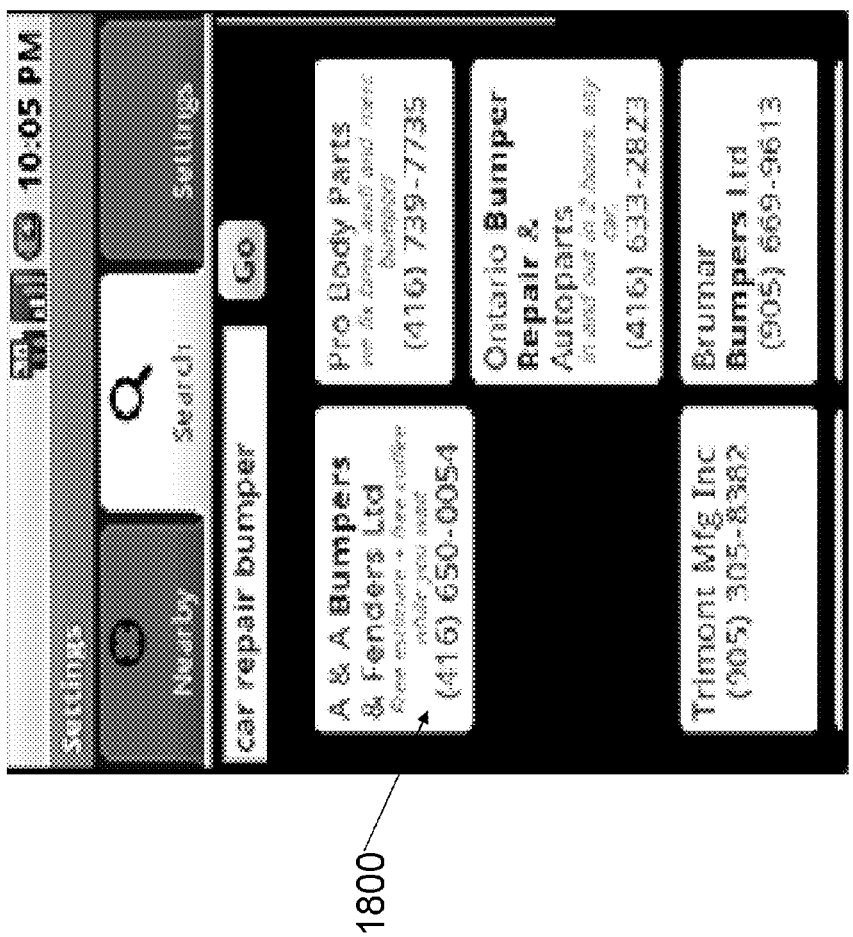
FIG. 18 shows an example of third supplemental information being displayed on a user terminal for a third business, in accordance with one embodiment of the present invention.

Once the businesses are notified of the search request (e.g., their badges are displayed), the business can communicate supplemental information to the user terminals through the server 144, 146, and 148. For example, in FIG. 15, Pro Body Parts sends supplemental information to the user terminal informing the user that they "fix bmw, audi, and merc bumpers" 1500. In some embodiments, the server notifies other participating businesses that Pro Body Parts sent supplemental information 1500 to the user terminal 146, 150. In various embodiments, the server provides the supplemental information 1500 itself to the other participating businesses. The other participating businesses may decide to compete with Pro Body Parts and also send supplemental information 152. For example, in FIG. 16, Ontario Bumper Repair & Autoparts uses its dashboard application 1600 to enter supplemental information 1602. The supplemental information 1602 offers to have "any car" "in and out in 2 hours." In FIG. 17, the supplemental information 1602 appears within the Ontario Bumper Repair & Autoparts badge 1406, 154, 156. The server also notifies the other participating businesses, including Pro Body Parts, of the supplemental information 1602 sent by Ontario Bumper Repair & Autoparts 158. In FIG. 18, another business joins the competition. A & A Bumpers and Fenders Ltd offers a "free estimate" and "free coffee while you wait" 1800. In this manner, a bidding war may ensue between the various participating businesses. Each participating business makes a better offer to win the business of the user. The user, on the other hand, can view and compare multiple offers on his terminal in a convenient way. Once the user determines which business he will choose, he can communicate with the business as described above (e.g., call the business, visit the business, or message the business via the application).

Figure 19:
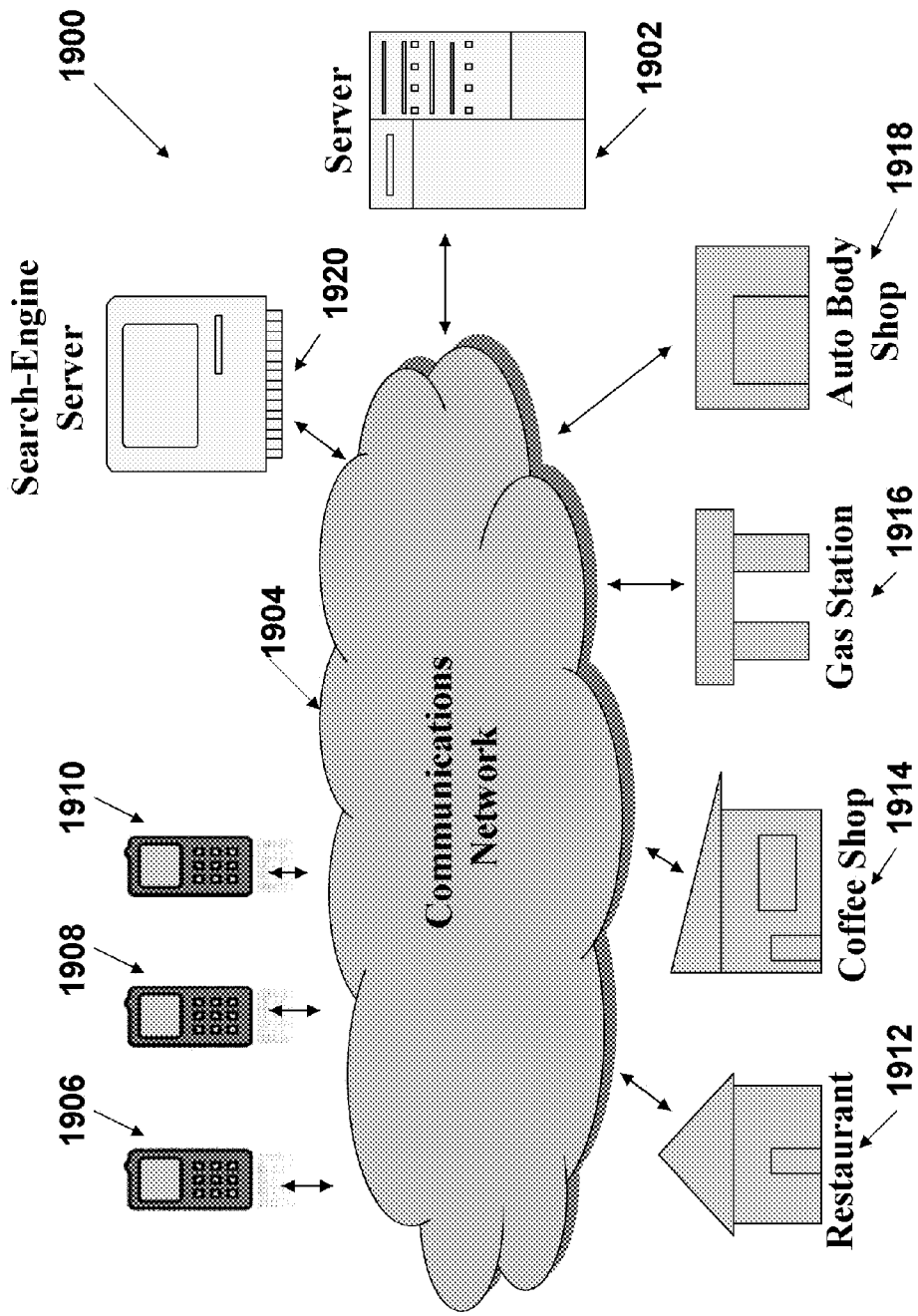
FIG. 19 shows a system for providing a user terminal with supplemental information to a search result, in accordance with one embodiment of the present invention.

FIG. 19 shows a system 1900 for providing a user terminal with supplemental information to a search result, in accordance with one embodiment of the present invention. The system includes a server 1902 that is in communication with a communications network 1904 such as the Internet. The server 1902 is also in communication with a plurality of user terminals 1906, 1908, 1910, each of which have a unique identifier such as a phone number. As explained above, when the user terminal 1906 sends a search request to the server 1902, the server creates a handle for the search request. The handle includes a unique identifier for the search request and it also includes the unique identifier for the user terminal 1906. The handle enables the creation of a communications channel between the server 1902 and the user terminal 1906 and also correlation of search results, electronic notifications, messages, and supplemental information. The supplemental information and messages related to the particular search request will be sent back and forth to the server along the communication channel. Each time the user terminal sends a search request, a new handle and communications channel is created for that particular search request. Furthermore, when the user closes a set of search results, the communications channel for the related search request also closes.

The server 1902 is also in communication with a plurality of participating businesses 1912, 1914, 1916, 1918 (e.g., restaurants, coffee shops, gas stations, and/or auto body shops). Each participating business 1912, 1914, 1916, 1918 can send supplemental information to the user terminals 1906, 1908, 1910 via the server 1902 using its dashboard application. In order to support this communication, another communications channel is set up between the server 1902 and the plurality of participating businesses 1912, 1914, 1916, 1918. Each of these participating businesses 1912, 1914, 1916, 1918 has a unique identifier such as a phone number. When the server 1902 notifies the participating business 1912 of a search request, it opens a new communication channel for that particular search request. The communication channel is identified using the unique identifier of the participating business and the handle for the search request. Communications (e.g., supplemental information, notifications, and messages) related to the search request are sent along the communications channel back and forth between the server 1902 and the participating business. When the user closes a set of search results, the communications channel for the search result between the server 1902 and the business 1912 also closes. Accordingly, there may be many logical communication channels between the server 1902 and any one participating business 1912, 1914, 1916, 1918 because a separate logical communications channel exists for each search request. The communication channels between the server 1902, user terminals 1906, 1908, 1910, and the participating businesses 1912, 1914, 1916, 1918 may be kept open using, for example, a TCP-IP protocol, Bayeux protocol, Long Poll protocol, or HTTP Streaming protocol. The communications channel enables real-time communication between the user terminals 1906, 1908, 1910, the server 1902, and/or the various businesses 1912, 1914, 1916, 1918.

In illustrative embodiments of the present invention, the server 1902 is also in communication with a search engine server 1920, such as Google™, Yahoo™, or Microsoft Bing™, via the communications network 1904. Communication with the search engine server 1920 enables the server 1902 to send search requests to a search engine and receive sets of search results from the search engine.

It should be noted that the server 1902 may provide intermediate search results as part of an iterative search process, i.e., between the sending of an initial search request by the user terminal and the sending of appropriate search results by the server. For example, in response to an initial search request for "cars," the server 1902 may provide a list of possible subjects (e.g., car dealers, car repair, car rental, etc.) from which the user can choose, and this process may continue until an appropriate level of granularity has been reached (e.g., selection of "car repair" might lead to a list including body repair, engine repair, transmission repair, etc.), and selection of a topic at this level may be sufficient for the server to provide search results for one or more relevant businesses.

As discussed above, embodiments of the present invention typically include an application that runs on the user terminal 1906. This application may provide a generic search interface (e.g., a window in which a query string is entered) and/or may provide a list of predetermined search topics (e.g., cab, restaurants, movie theaters, hair stylists, etc.). Alternatively, the application may be "hard coded" for a specific search topic that is automatically communicated to the server 1902, e.g., when the user runs the application. In this latter case, for example, the application may automatically transmit the location, time, and query to the server 1902 as a default without further input from the user and may optionally allow the user to override the location and/or query with manual inputs.

In embodiments of the present invention, certain businesses may receive preferred treatment, e.g., participating businesses may receive preferred treatment relative to non-participating businesses. For example, information for participating businesses may be displayed more prominently on the user terminal (e.g., displayed first on the screen, using larger badges, using enhanced colors or graphics, and/or highlighted by wording such as "preferred vendor" or the like), or non-participating businesses may be omitted when there is a sufficient number of participating businesses that meet a particular search. In this way, there is an incentive for businesses to become participating businesses and to subscribe to the services provided by the server.

The server 1902 may send additional content (e.g., advertisements, links to related information, etc.) to the user terminal. Such additional content may be selected, for example, based on the query, location, time, search results received from a search engine, and/or supplemental information.

While embodiments of the present invention are described above with reference to a server 1902 that may communicate with a separate search engine, it should be noted that some or all of the described server functionality may be integrated with a search engine.

It should be noted that terms such as "user terminal" and "server" may be used herein to describe devices that may be used in certain embodiments of the present invention and should not be construed to limit the present invention to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies.

It should also be noted that devices may use communication protocols and messages (e.g., messages created, transmitted, received, stored, and/or processed by the system), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, interfaces, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention.

What is claimed is:

1. A computerized method for providing a user terminal with supplemental information to a search result, the method comprising:

receiving a search request from the user terminal, the search request including a geographic location for the user terminal, a time associated with the search request, and a query;

communicating a set of search results to the user terminal, the set of search results including search results that include identifying information of at least a first business and a second business;

determining that the first business and the second business are participating businesses by searching the search results for the identifying information;

providing an electronic notification of the search request to at least the first business and the second business;

receiving, from the first business, supplemental information associated with the first business responsive to the notification; and communicating the supplemental information to the user terminal and at least the second business.

2. A method according to claim 1, further comprising:
in a computer process, using the geographic location of the user terminal and the query to determine the set of search results.

3. A method according to claim 1, further comprising:
communicating the search request over the internet to a search engine; and
receiving the set of search results from the search engine.

4. A method according to claim 1, further comprising:
receiving, from the second business, second supplemental information associated with the second business; and
communicating the supplemental information to the user terminal and to at least the first business.

5. A method according to claim 1, further comprising:
causing display of the supplemental information within the set of search results.

6. A method according to claim 1, wherein the information associated with at least one of the first business and the second business includes information identifying at least one of the businesses.

7. A method according to claim 1, wherein the supplemental information associated with the first business includes at least one of an offer for sale of services and an offer for sale of goods.

8. A method according to claim 1, wherein the notification to the first business and second business includes the geographic location of the user terminal, the time associated with the search request, and the query.

9. A method according to claim 1, further comprising:
receiving a message from the user terminal; and
communicating the message to the at least one of the first business and second business.

10. A method according to claim 1, wherein the query includes a string of textual information.

11. Apparatus comprising at least one non-transitory computer readable medium encoded with instructions which when loaded on at least one computer, establish processes for providing a user terminal with supplemental information to a search result, the processes including:

receiving a search request from the user terminal, the search request including a geographic location for the user terminal, a time associated with the search request, and a query;

communicating a set of search results to the user terminal, the set of search results including search results that include identifying information of at least a first business and a second business;

determining that the first business and the second business are participating businesses by searching the search results for the identifying information;

providing an electronic notification of the search request to at least the first business and the second business;

receiving, from the first business, supplemental information associated with the first business responsive to the notification; and communicating the supplemental information to the user terminal and at least the second business.

12. An apparatus according to claim 11, wherein the instructions establish processes further including:

in a computer process, using the geographic location of the user terminal and the query to determine the set of search results.

13. An apparatus according to claim 11, wherein the instructions establish processes further including:

communicating the search request over the internet to a search engine; and receiving the set of search results from the search engine.

14. An apparatus according to claim 11, wherein the supplemental information associated with the first business includes at least one of an offer for sale of services and an offer for sale of goods.

15. An apparatus according to claim 11, wherein the instructions establish processes further including:

receiving, from the second business, second supplemental information associated with the second business; and communicating the supplemental information to the user terminal and to at least the first business.

16. An apparatus according to claim 11, wherein the instructions establish processes further including:

causing display of the supplemental information within the set of search results.

17. A system for providing a user terminal with supplemental information to a search result, the system comprising:

a processor; and a memory storing instructions executable by the processor to perform processes that include:

receiving a search request from the user terminal, the search request including a geographic location for the user terminal, a time associated with the search request, and a query;

communicating a set of search results to the user terminal, the set of search results including search results that include identifying information of at least a first business and a second business;

determining that the first business and the second business are participating businesses by searching the search results for the identifying information;

providing an electronic notification of the search request to at least the first business and the second business;

receiving, from the first business, supplemental information associated with the first business responsive to the notification; and communicating the supplemental information to the user terminal and at least the second business.

18. A system according to claim 17, wherein the processes further include:

using the geographic location of the user terminal and the query to determine the set of search results.

19. A system according to claim 17, wherein the processes further include:

communicating the search request over the internet to a search engine; and receiving the set of search results from the search engine.

20. A system according to claim 17, wherein the processes further include:

causing display of the supplemental information within the set of search results.

\* \* \* \* \*